3,830,741
PROCESS FOR PRODUCING LIQUID DEVELOPER FOR USE IN ELECTROPHOTOGRAPHY
Yasuo Tamai, Odawara, and Hajime Miyatuka, Asaka, Japan, assignors to Fuji Photo Film Co., Ltd., Minami Ashigara-shi, Kanagawa, Japan
No Drawing. Filed June 18, 1973, Ser. No. 371,022
Claims priority, application Japan, June 17, 1972, 47/60,654
Int. Cl. G03g 9/04
U.S. Cl. 252—62.1          12 Claims

ABSTRACT OF THE DISCLOSURE

A liquid electrophotographic developer is produced by cooling a fused polynuclear aromatic hydrocarbon having at least 3 rings containing dissolved phthalocyanine pigment to prepare a mixture thereof, and adding the mixture to a carrier liquid having a high electric resistance and a low dielectric constant. The mixture may be cooled by mixing with the carrier liquid.

BACKGROUND OF THE INVENTION

Field of the Invention

The present invention relates to a process for producing a liquid developer for use in electrophotography and, more particularly, to a process for producing a liquid developer for use in electrophotography containing a phthalocyanine pigment toner.

DESCRIPTION OF THE PRIOR ART

Phthalocyanine pigments are in wide use as coloring agents due to their excellent weather resistance and excellent resistance to chemicals. It is well known to use phthalocyanine pigments as toners for developers in electrophotography (e.g., see Japanese Patent Publications 5,510/60; 13,424/60; 5,511/60; 13,440/65; 14,115/65; 16,831/65; 18,462/65; 20,150/65; 11,069/66 and 17,185/66).

Toners for a liquid developer have heretofore been produced by kneading a phthalocyanine pigment in an organic solvent, alone or together with a resin for dispersion, for long periods of time. However, phthalocyanine pigments are so difficult to pulverize that it is extremely difficult to prepare a fine toner therefrom. Insufficient pulverization reduces the dispersion stability of the resulting liquid developer. In order to avoid such troublesome kneading steps, one process uses a processed pigment (see Japanese Patent Publication 11,069/66). However, in this process, it is difficult to obtain a toner having a desired tone and resins used in the processed pigment are always contained in the resulting liquid developer.

SUMMARY OF THE INVENTION

One object of the present invention is to provide a process for producing a novel liquid developer for use in electrophotography.

Another object of the invention is to provide a process for producing a liquid developer containing as a toner an extremely fine phthalocyanine.

A further object of the invention is to provide a process for producing a liquid developer containing a toner having a cyan color, blue color or green color.

The present invention relates to a process for producing a liquid developer for use in electrophotography, which comprises cooling a heat-melted, fused polynuclear aromatic hydrocarbon having at least 3 rings and having dissolved therein a phthalocyanine pigment to prepare a mixture of the pigment and hydrocarbon, and adding the mixture to a carrier liquid having a high electrical resistance and a low dielectric constant.

DETAILED DESCRIPTION OF THE INVENTION

The inventors found that phthalocyanine can be dispersed in a carrier liquid in an extremely fine state by cooling a molten polynuclear aromatic hydrocarbon containing dissolved therein phthalocyanine to prepare a mixture thereof, and subsequently adding the resulting mixture to a carrier liquid. In this case, the major part of the polynuclear hydrocarbon is dissolved in the solvent while a minor part is absorbed on the surfaces of the phthalocyanine particles to, we believe, enhance the dispersion stability of the particles.

As the fused, polynuclear hydrocarbons used in the invention, anthracene is particularly preferred. In addition, phenanthrene, pyrene, chrysene, naphthacene and the like are also usable. All are liable to be sublimed upon heating. Therefore, heating after adding them to the phthalocyanine is preferably conducted in a hermetically closed system, e.g., in a glass ampoule. Also, in the case of conducting the heating in the open, it is preferable to add the hydrocarbon in advance in an amount larger than is required.

Specific examples of the phthalocyanines suitable in the present invention are copper phthalocyanine, chlorine-substituted phthalocyanine (also referred to as Phthalocyanine Green), partially chlorine-substituted phthalocyanine, zinc phthalocyanine, metal-free phthalocyanine, and the like. Most preferred of the partially chlorine-substituted phthalocyanine materials are those which contain from 2 to 6 chlorine atoms in the phthalocyanine molecule.

In the present invention, it has been found that it is preferred to use not more than about 6 parts by weight of the phthalocyanine pigment per 10 parts by weight (hereinafter, all parts are by weight) of a fused, polynuclear aromatic hydrocarbon. If the pigment is added in greater amount, a coarse toner will be formed in the resulting liquid developer.

There are many methods to cool the melt composed of the fused, polynuclear hydrocarbon and the phthalocyanine. For example, cooling can be conducted by exposure to a cold air stream or by pouring into water. In addition, a liquid developer can directly be obtained by adding the molten mixture to a carrier liquid. The rate of cooling is desirably about about 50° C./minute, more preferably above about 100° C./minute. The exact rate of cooling is not overly important, however.

As the carrier liquid used in the invention, there can be illustrated various liquids having an electrical resistance of above about $10^{10}$ ohm-cm. and a dielectric constant of not greater than 3. That is, straight chain aliphatic hydrocarbons such as octane, nonane, decane, etc., branched chain aliphatic hydrocarbons such as isooctane, isononane, etc., alicyclic hydrocarbons such as cyclohexane, Decalin, etc., chlorofluorohydrocarbons such as difluorotetrachloroethane, trifluorotrichloroethane, etc., and the like can be used. However, from the industrial viewpoint, it is desirable to use inexpensive materials such as conventional mineral oil products, e.g., kerosene, gasoline, ligroin, mineral spirits, etc. In particular, an isoparaffin solvent is excellent as a carrier liquid. One such isoparaffin solvent is marketed by Esso Standard Oil Co. under the trade name of "Isopar."

To the liquid developer produced in accordance with the present invention there can be added a small amount of a charge-adjusting agent, if desired. For example, in the case of adjusting the toner to the positively charged state, there can be used various metallic soaps as shown in U.S. Pat. 3,259,581, e.g., manganese linoleate, cobalt naphthenate, manganese resinate, cobalt oleate, etc.; metal salts of 2-ethylhexanoic acid, borates or silicates of long-chain alcohols, etc., as shown in Japanese Patent Publication 20,868/66, and the like. In addition, various charge-adjusting agents as shown in Japanese Patent Applications 88,778/70; 88,779/70 and 99,982/70 provide desirable results. Also, a copolymer between a long-chain alkyl methacrylate and acrylic acid can be used.

These agents provide particularly preferred results when used in combination with copper phthalocyanine or metal-free phthalocyanine.

In the case of adjusting the toner to the negatively charged state, there can be used polyamide resins as shown in Japanese Patent Publication 26,715/68, calcium alkylsulfonates as shown in Japanese Patent Publication 556/70, lecithin as shown in Japanese Patent Publication 21,798/68, and the like. Also, copolymers between long-chain alkyl methacrylates and dialkylaminomethacrylates can be used. These agents provide particularly preferred results when used in combination with chlorine-substituted phthalocyanines.

The amount of charge-adjusting agent added in usually about 0.005 to about 0.5 wt. percent based on the carrier liquid.

In addition, various resins, or oil and fats may be used so as to enhance dispersibility. For example, there can be used polyalkyl methacrylates, alkyd resins, polystyrenes, polybutenes, soybean oils, linseed oils, tung oils, cotton seed oils, etc. These materials are generally added in an amount from about 0.1 to about 20 weight percent of the liquid developer.

In the present invention, a preferred liquid developer results when the phthalocyanine pigment is added in an amount of about 0.1 part to about 10 parts per 1,000 parts of carrier liquid. Most preferred liquid developers in accordance with the present invention are those where the toner size is from about 0.05 to about 4 microns. This range is not limitative in the sense that inoperative results are obtained outside the range, but this range is in accordance with standard commercial requirements at this time.

The toner in accordance with the present invention is extremely fine in size and has a uniform particle diameter, and hence it is suitable for the reproduction of continuous tones as well as for the duplication of lines.

The present invention will now be described in greater detail by several non-limiting examples of preferred embodiments.

EXAMPLE 1

20 Parts of anthracene (melting point: 216° C.) was put in a porcelain crucible and heated gently. When the anthracene began to melt, sublimation of the anthracene became so vigorous that part of it was recrystallized on the upper portions and the lid of the crucible. 2 Parts of Phthalocyanine Blue (copper phthalocyanine, made by Toyo Ink Mfg. Co., Ltd.; copper phthalocyanine is charged positive) was added to the anthracene melt while maintaining the melt at 220° C. and, upon stirring, Phthalocyanine Blue was observed to be immediately dissolved in the anthracene melt. After 2 minutes, the contents of the crucible were poured into water to obtain a blue, massive product. The recovered massive product was pulverized with ease in a mortar to obtain a pale blue powder. 5 Parts of the resulting powder was added to 1,000 parts of Isopar (isoparaffinic solvent, made by Esso Standard Oil Co.; aniline point: 80° C.; initial boiling point: 158° C.; dry point: 177° C.) and vigorously stirred to obtain a blue liquid developer.

When an electrostatic latent image on a commercially available, electrophotographic light-sensitive zinc oxide material was developed with the resulting developer, there was obtained a blue positive image of the original. The image thus formed was very distinct. Additionally, the toner was positively charged.

EXAMPLE 2

| | Parts |
|---|---|
| Phthalocyanine Blue (made by Toyo Ink Mfg. Co., Ltd.) | 5 |
| Anthracene (m.p.: 216° C.) | 20 |
| Phenanthrene (m.p.: 100–102° C.) | 3 |

Each of the above components was pulverized in a mortar and mixed, then sealed in a glass ampoule under reduced pressure. Then, the ampoule was immersed in a silicone oil bath kept at 220° C. and heated for 1 hour. After 1 hour, the ampoule was taken out and immediately put into water to cool it. The contents changed to a blue, massive product. This massive product was pulverized, and 7 parts of it was added to the following mixture while ultrasonic waves (29 kHz.) were applied thereto.

| | Parts |
|---|---|
| Isopar H (isoparaffinic solvent made by Esso Standard Oil Co.; aniline point: 83° C.; initial boiling point: 174° C.; dry point: 189° C.) | 980 |
| Cotton seed oil | 20 |
| Cobalt naphthenate | 0.05 |

There was thus obtained a blue liquid developer. The mean grain diameter of the toner particles was 0.05 micron, and the dispersibility thereof was greater than in Example 1.

EXAMPLE 3

A cyan color liquid developer was obtained as in Example 2 using 2 parts of Phthalocyanine Blue and 3 parts of metal-free phthalocyanine (made by Dainichi Seika Co., Ltd.) instead of 5 parts of Phthalocyanine Blue. The resulting developer was excellent in its spectral reflection characteristics and was therefore suitable for color duplication.

EXAMPLE 4

The procedures described in Example 1 were repeated using 19 parts of anthracene and 1 part of naphthacene instead of 20 parts of anthracene. Since naphthacene dissolved well in the anthracene melt, a molten liquid containing phthalocyanine was prepared by heating to 220° C., though naphthacene has a melting point as high as 335° C. There was thus obtained a blue liquid developer in the same manner as in Example 1.

EXAMPLE 5

The procedures described in Example 1 were repeated using Phthalocyanine Green (chlorine-substituted phthalocyanine, made by Toyo Ink Mfg. Co., Ltd.; chlorine substituted copper phthalocyanine is charged negative) instead of Phthalocyanine Blue. When a liquid developer was produced in the same manner as in Example 1, there was obtained a liquid developer containing a green toner. The toner was negatively charged.

EXAMPLE 6

The procedures described in Example 1 were repeated using cyclohexane instead of Isopar to prepare a blue liquid developer, the dispersion of which was stable and in which the charge of the toner was positive. The resulting liquid developer was rapid-drying.

While the invention has been described in detail and with reference to specific embodiments thereof, it will be apparent to one skilled in the art that various changes and modifications can be made therein without departing from the spirit and scope thereof.

What is claimed is:

1. A process for producing a liquid developer for use in electrophotography, which comprises cooling a heat-melted fused polynuclear aromatic hydrocarbon having at least 3 rings and having dissolved therein a phthalocyanine pigment to prepare a mixture of said pigment and said hydrocarbon and adding the mixture to a carrier liquid having an electrical resistance of above about $10^{10}$ ohm-cm. and a dielectric constant not greater than 3;

wherein not more than about 6 parts by weight of the phthalocyanine pigment is present per 10 parts by weight of heat-melted fused, polynuclear aromatic hydrocarbon; and wherein the phthalocyanine pigment is added in an amount of about 0.1 part to about 10 parts per 1,000 parts of carrier liquid.

2. A process as claimed in Claim 1 wherein the fused polynuclear aromatic hydrocarbon having at least 3 rings and having dissolved therein a phthalocyanic pigment is cooled by addition to said carrier liquid.

3. A process as claimed in Claim 1 wherein said phthalocyanine pigment is selected from the group consisiting of copper, chlorine-substituted, partially chlorine-substituted, zinc- and metal-free phthalocyanine.

4. The process as claimed in Claim 3 wherein said partially chlorine-substituted phthalocyanine is substituted with from 2 to 6 chlorine atoms.

5. The process as claimed in Claim 1 wherein said fused polynuclear aromatic hydrocarbon has up to 6 rings.

6. The process as claimed in Claim 3 wherein said fused polynuclear hydrocarbon is selected from the group consisting of anthracene, phenanthrene, pyrene, chrysene and naphthacene.

7. The process as claimed in Claim 1 wherein the cooling is at a rate above about 50° C. per minute.

8. The process as claimed in Claim 7 wherein the cooling is at a rate of above about 100° C. per minute.

9. The process as claimed in Claim 1 wherein the carrier liquid is selected from the group consisting of straight chain aliphatic hydrocarbons, branched chain aliphatic hydrocarbons, alicyclic hydrocarbons and chlorofluoro hydrocarbons.

10. The process as claimed in Claim 1 wherein the carrier liquid is selected from the group consisting of kerosene, gasoline, ligroin and mineral spirits.

11. The process as claimed in Claim 1 wherein the carrier liquid is an isoparaffin solvent.

12. The process as claimed in Claim 1 wherein the phthalocyanine pigment in the carrier liquid has a size of from about 0.05 to about 4 microns.

References Cited

UNITED STATES PATENTS

| | | | |
|---|---|---|---|
| 2,828,180 | 3/1958 | Sertorio | 8—62 |
| 3,097,047 | 7/1963 | Weinstein | 8—94 |
| 3,551,337 | 12/1970 | Robinson | 252—62.1 |

FOREIGN PATENTS

| | | | |
|---|---|---|---|
| 4,111,069 | 6/1966 | Japan | 252—62.1 |

J. TRAVIS BROWN, Primary Examiner

J. P. BRAMMER, Assistant Examiner

U.S. Cl. X.R.

106—288, 308, 309